US012631452B2

(12) United States Patent
Kuruvilla et al.

(10) Patent No.: US 12,631,452 B2
(45) Date of Patent: May 19, 2026

(54) METHODS AND SYSTEMS FOR FUSING KINEMATICS DATA FOR A PLURALITY OF VEHICLES

(71) Applicant: NOBLIS, INC., Reston, VA (US)

(72) Inventors: Eapen Kuruvilla, Naperville, IL (US); Muhammad Anwar Hussain, North Potomac, MD (US); Anand Seshadri, Falls Church, VA (US); George Ryan Plyler, Alexandria, VA (US); Denise Michelle Masi, Burke, VA (US); Mohammed Omar Zaatari, McLean, VA (US)

(73) Assignee: NOBLIS, INC., Reston, VA (US)

( * ) Notice: Subject to any disclaimer, the term of this patent is extended or adjusted under 35 U.S.C. 154(b) by 65 days.

(21) Appl. No.: 18/531,087

(22) Filed: Dec. 6, 2023

(65) Prior Publication Data

US 2025/0189314 A1    Jun. 12, 2025

(51) Int. Cl.
  *G01C 21/00*      (2006.01)
  *G01C 21/16*      (2006.01)
(52) U.S. Cl.
  CPC ......... *G01C 21/005* (2013.01); *G01C 21/165* (2013.01)
(58) Field of Classification Search
  CPC ............................ G01C 21/005; G01C 21/165
  See application file for complete search history.

(56) References Cited

U.S. PATENT DOCUMENTS

| | | | |
|---|---|---|---|
| 7,983,694 B2 * | 7/2011 | Cheok .................. H04W 64/00 |
| | | | 701/408 |
| 8,478,292 B2 | 7/2013 | Kim et al. |
| 9,612,123 B1 * | 4/2017 | Levinson ............... B60Q 1/508 |
| 11,507,789 B2 * | 11/2022 | Park ..................... G06V 10/803 |
| 2019/0012909 A1 * | 1/2019 | Mintz ................ G06Q 30/0206 |
| 2020/0014759 A1 * | 1/2020 | Wunderlich ............. G08G 1/20 |
| 2020/0189633 A1 * | 6/2020 | Green .................. B61L 23/041 |
| 2020/0234582 A1 * | 7/2020 | Mintz ............. G08G 1/096811 |
| 2020/0284590 A1 * | 9/2020 | Chen ................. G01C 21/3841 |
| 2020/0336541 A1 * | 10/2020 | Naderi Alizadeh .. G05D 1/0088 |
| 2021/0049902 A1 * | 2/2021 | Zhang .................. G05D 1/0291 |
| 2022/0179061 A1 * | 6/2022 | Li .......................... G01S 13/878 |
| 2023/0176557 A1 * | 6/2023 | Cella .................... G05B 13/048 |
| | | | 700/117 |
| 2023/0237905 A1 * | 7/2023 | Kellari ............... B60W 60/001 |
| | | | 701/24 |
| 2024/0219184 A1 * | 7/2024 | Kulkarni ................ G01C 21/30 |
| 2024/0303999 A1 * | 9/2024 | Datta Gupta ......... G06V 20/58 |
| 2025/0198794 A1 * | 6/2025 | Tabrikian .............. H04W 4/029 |

* cited by examiner

*Primary Examiner* — Jess Whittington
(74) *Attorney, Agent, or Firm* — Morrison & Foerster LLP

(57)          ABSTRACT
Methods and systems for processing sensor data for a plurality of vehicles are described. A first kinematic dataset is received from a sensor on a first vehicle, wherein the first kinematic dataset comprises a first location data of the first vehicle and a first ranging distance data for a first pair of vehicles comprising the first vehicle. A second kinematic dataset describing a plurality of vehicles is received. Data from the first kinematic dataset and dataset from the second kinematic dataset is fused, to generate a fused dataset, wherein the fused dataset comprises a fused location data of the first vehicle and a fused ranging distance data from the first pair.

25 Claims, 6 Drawing Sheets

System
300

Network 304

Communications 308

Communications 308

Communications 308

Device 200

Device 306

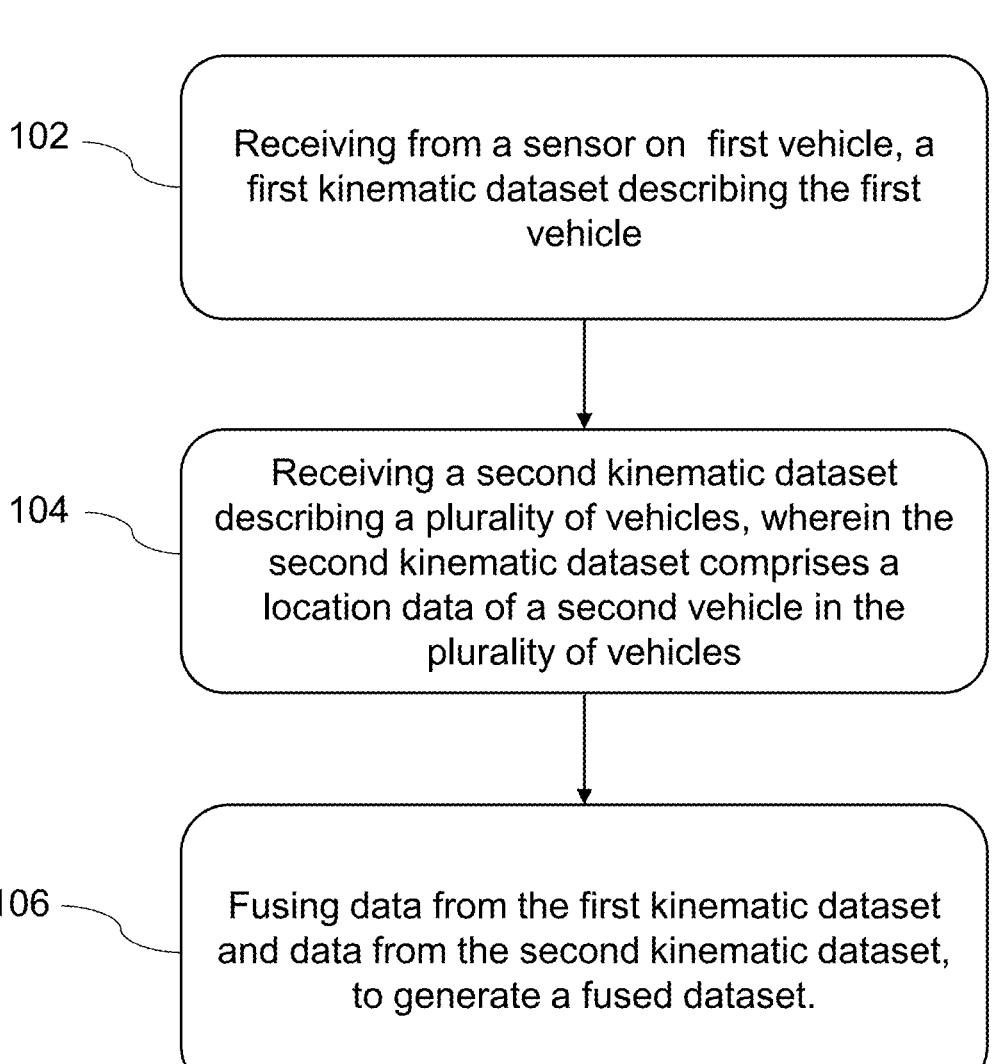

100

102 — Receiving from a sensor on  first vehicle, a first kinematic dataset describing the first vehicle 104 — Receiving a second kinematic dataset describing a plurality of vehicles, wherein the second kinematic dataset comprises a location data of a second vehicle in the plurality of vehicles 106 — Fusing data from the first kinematic dataset and data from the second kinematic dataset, to generate a fused dataset.

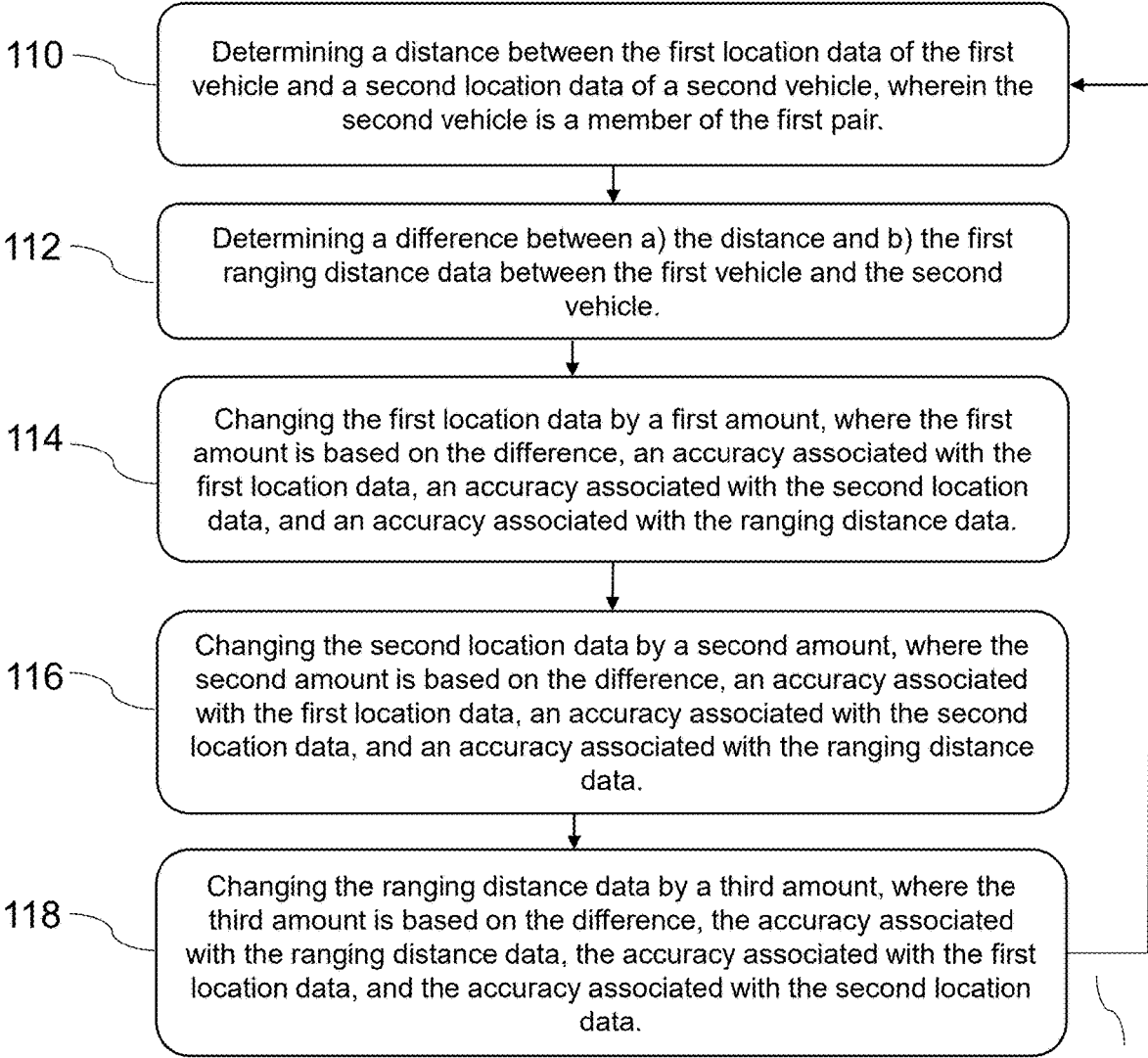

110 — Determining a distance between the first location data of the first vehicle and a second location data of a second vehicle, wherein the second vehicle is a member of the first pair.

112 — Determining a difference between a) the distance and b) the first ranging distance data between the first vehicle and the second vehicle.

114 — Changing the first location data by a first amount, where the first amount is based on the difference, an accuracy associated with the first location data, an accuracy associated with the second location data, and an accuracy associated with the ranging distance data.

116 — Changing the second location data by a second amount, where the second amount is based on the difference, an accuracy associated with the first location data, an accuracy associated with the second location data, and an accuracy associated with the ranging distance data.

118 — Changing the ranging distance data by a third amount, where the third amount is based on the difference, the accuracy associated with the ranging distance data, the accuracy associated with the first location data, and the accuracy associated with the second location data.

PROCESSOR(S)

220

INPUT
DEVICE

240

MEMORY
STORAGE

250

SOFTWARE
MODULE

260

COMMUNICATION
DEVICE

230

OUTPUT
DEVICE

280

System
300

METHODS AND SYSTEMS FOR FUSING KINEMATICS DATA FOR A PLURALITY OF VEHICLES

FIELD OF THE DISCLOSURE

The present disclosure relates to methods and systems for processing sensor data for a plurality of vehicles. More specifically, the methods and systems described herein process sensor data to control a plurality of vehicles.

BACKGROUND OF THE DISCLOSURE

Vehicle control systems for autonomous and semi-autonomous vehicles rely on a vehicles ability to estimate its own kinematics. The estimation of a vehicle's own kinematic properties is especially important when the vehicle is a member of a group, such as a drone swarm, or a fleet of autonomous vehicles. Knowledge of the vehicle's kinematics can be used to control the vehicle in a coordinated fashion. For example, if the location, speed, and/or relative distance of a vehicle and its neighbor is known, a vehicle can use the kinematics data to plan an efficient route, while avoiding the onset of a collision with another moving vehicle, or stationary obstacles in the environment.

SUMMARY OF THE DISCLOSURE

The present disclosure relates to methods and systems for processing sensor data for a plurality of vehicles. More specifically, the present disclosure relates to methods and systems for fusing kinematics data obtained from at least two sensors or reception from at least one neighboring vehicle, such that the fused kinematics data results in more accurate kinematics data, relative to the raw input data obtained by the one or more sensors. In some embodiments, the input kinematics data can include ranging distances, such as those derived from LIDAR or UWB, and location data. Importantly, the methods and systems described herein can be used to improve the accuracy of kinematics data estimates for vehicles that are members of a larger group of vehicles. In contrast to traditional methods, such improvements can be done at scale, such that fusing the input data remains computationally efficient, even when applied to increasingly large groups of vehicles.

As noted above, vehicle control systems may rely on one or more techniques to determine vehicle kinematics. Traditional methods for estimating accurate kinematics data of a vehicle, however, have various shortcomings. For example, global positioning system (GPS)-based technologies require line-of-sight (LOS) visibility to an adequate number of GPS satellites from the vehicle, and LOS visibility to a GPS satellite may not always be possible. As another example, vehicles using inertial navigation system (INS)-based technologies are prone to increased errors when the vehicle is oriented in a direction different from the direction of its velocity. Traditional methods of estimating vehicle kinematics lack robustness and accuracy.

Traditional methods of improving the accuracy of vehicle location estimates can involve estimating the distance between a vehicle and fixed anchor points, such that the vehicle's coordinates are expressed in relation to the fixed points. A vehicle's access to such fixed points, however, cannot always be assumed. For example, a vehicle may be too far from a fixed anchor point to ascertain a reasonable estimate. Alternatively, establishing a fixed anchor point may not be plausible, for instance, if the vehicles are deployed in a novel and/or unexpected environment.

In addition to the suboptimal accuracy of methods for improving a vehicle's specific location estimates, traditional computational methods aimed at improving general kinematic data estimates are also inefficient and time-intensive. Traditional computational methods include Gauss-Newton-based algorithms to solve a non-linear least square set (NLSS) of equations, such that some of the variables in the NLSS equations represent estimates of vehicle kinematics data (e.g., vehicle location data). NLSS solvers, however, are slow. The time for an NLSS solver to yield kinematics estimates is often greater than the time constraints optimal for real-time navigation. In addition, the time complexity of NLSS solvers is high. NLSS solvers evaluate the Jacobian function for every Euclidean coordinate, for every vehicle, for every iteration. As a result, NLSS solvers scale poorly, with respect to the number of vehicles for which kinematics data is being estimated. This fundamental limitation is especially problematic in the context of groups of vehicles, e.g., a drone swarm. An alternative method to NLSS solvers would be of special relevance to applications pertaining to vehicle groups.

Described herein are methods and systems that may address the above-identified problems with suboptimal methods of estimating a vehicle's kinematic data, particularly for vehicles that operate within a group of vehicles. The methods and systems described herein can be used to improve the accuracy of kinematics data estimates for vehicles that are members of a larger group of vehicles. The methods are particularly germane to the estimation of a vehicle's location data.

To address the above-identified shortcomings, disclosed herein are computationally efficient techniques for estimating a vehicle's kinematic data with high accuracy in situations in which the vehicle is in a group of vehicles. Computational efficiency of the techniques described herein is enabled by leveraging the group context of a vehicle. In contrast to the existing NLSS solvers, which evaluate a single vehicle at a time, the embodiments described herein evaluates a fusion function at pairs of vehicles at a time, and the evaluation of each pair yields location estimates for both vehicles of the pair. By operating in a pairwise manner, the method vastly improves on the time complexities of traditional techniques—by approximately 50 times—for estimating a vehicle's kinematics data. The evaluation of the fusion function for a pair of vehicles can also be performed on multiple vehicles in the group, and so several fusion functions can be evaluated, in parallel, across the group members. Thus, a distributed time-efficient method of estimating vehicle kinematics is provided.

In addition to the improved efficiency, the methods and systems disclosed herein improve on the accuracy of the kinematics data estimates. In some embodiments, when multiple data sources exist for the same kinematics parameter—e.g., the speed of a first vehicle—the disclosed methods can fuse those sources via traditional techniques, such as by combining the estimates for the parameter by weighting the estimates by the normalized inverse squares of their accuracies. Once a vehicle obtains estimates for several kinematics parameters for at least two vehicles—of which, locations of the first vehicle and a second vehicle, as well as a ranging distance between the two vehicles, are included—the estimates for the kinematics data can be improved according to the methods disclosed herein. A Euclidean distance can be computed between the two vehicles, and the Euclidean distance can be compared against the ranging distance between the two vehicles, to yield a difference value. The ranging distance as well as the location data of each vehicle can then be moved towards the other vehicle, by an amount that can be expressed in terms of the difference value and the accuracies associated with the vehicle's locations and ranging distance. This adjusting of the vehicles towards each other by the described amount can be reiterated until a desired accuracy for the kinematics estimates is achieved. In this manner, input kinematics data can be fused for increased accuracy, for a vehicle in a group.

In some embodiments, the disclosed methods leverage the fact that a group of vehicles comprises one or more pairs of vehicles, and the methods fuse input data for a given pair of vehicles. Given that the methods disclosed herein fuse the input data for a given pair of vehicles in the group, the number of fusion computations may accordingly scale with the number of pairs of vehicles in the group, scaling at $_nC_2$, where n is the total number of vehicles in the group. Accordingly, the methods disclosed herein can estimate kinematics data, such as the location of vehicles in a group, with far fewer iterations than traditional methods (e.g., the methods disclosed herein can use fewer iterations than the number of vehicles in a group, to estimate the positions of the group vehicles). The methods and systems described herein provide both increased computational efficiency and accuracy, relative to existing methods, when estimating kinematics data for vehicles in a group.

Compared to a scenario where vehicles use raw unfused kinematics data, or compared to a case where vehicles use traditional methods of processing input data, the high-accuracy fused kinematics data resulting from the methods and systems disclosed herein can be used to better control vehicles in groups. Controlling vehicles based on the efficient production of higher accuracy data can, for example, result in minimal redundancies in cooperative navigation, and can minimize collisions. The methods and systems described herein have direct applications to moving vehicles within a group.

In some embodiments, the disclosed methods and systems use ranging distances between pairs of vehicles in the group of vehicles, as part of the input data to be fused. The input data can be obtained by at least one onboard sensor, including a sensor onboard another vehicle, which can then be transmitted via a communication channel. The communication channel can include, but is not limited to, technologies based on ultrawide broadband (UWB), Wi-Fi, Bluetooth, 4G or 5G communication channels. The fusing of ranging distance data with location data enables the fast and accurate estimation of the vehicles' kinematics.

Disclosed herein is a method comprising: receiving, at one or more processors, from a sensor on a first vehicle, a first kinematic dataset describing the first vehicle, wherein the first kinematic dataset can comprise a) a first location data of the first vehicle, and b) a first ranging distance for a first pair of vehicles comprising the first vehicle; receiving, at the one or more processors, a second kinematic dataset describing a plurality of vehicles, wherein the second kinematic dataset can comprise a location data of a vehicle other than the first vehicle in the plurality of vehicles, and; fusing, at the one or more processors, data from the first kinematic dataset and data from the second kinematic dataset, to generate a fused dataset, wherein the fused location of the first vehicle can have a higher accuracy that then first location data of the first vehicle and the fused ranging distance for the first pair can have a higher accuracy than the first ranging distance of the first pair. In some embodiments, the second kinematic dataset can further comprise a second ranging distance data for a second pair of vehicles, not including the first vehicle, in the plurality of vehicles. In any of the embodiments herein, the method can further comprise moving the first vehicle or the vehicle other than the first vehicle in the plurality of vehicles, based on the fused dataset.

In some embodiments, the first kinematic dataset can comprise a time at which the first kinematic dataset is received. In any of the embodiments herein, the method can be performed at a regular interval. In some embodiments, the regular interval can be 500 ms.

In any of the embodiments herein, the second kinematic dataset can comprise data received from a sensor on the vehicle other than the first vehicle in the plurality of vehicles. In any of the embodiments herein, the second kinematic dataset can comprise data determined by the vehicle other than the first vehicle in the plurality of vehicles. In any of the embodiments herein, the fused dataset can be a first fused dataset, and the second kinematic dataset can comprise data from a second fused dataset. In any of the embodiments herein, the second fused dataset can be determined by the vehicle other than the first vehicle in the plurality of vehicles. In any of the embodiments herein, the second kinematic dataset can comprise a time at which the second kinematic dataset is received.

In any of the embodiments herein, the first kinematic dataset can further comprise a first acceleration, a first velocity, or a first displacement, of the first vehicle. In any of the embodiments herein, the second kinematic dataset can further comprise a second acceleration, a second velocity, or a second displacement, of the vehicle other than the first vehicle in the plurality of vehicles. In any of the embodiments herein, the first acceleration or second acceleration can be determined by an inertial measurement unit (IMU). In any of the embodiments herein, the first velocity or the second velocity can be determined by GPS, ultra-wideband (UWB), Bluetooth, 4G, 5G, or a combination thereof. In any of the embodiments herein, the first displacement or the second displacement can be determined by GPS, UWB, Bluetooth, 4G, 5G, or a combination thereof. In any of the embodiments herein, the first, second, or fused ranging distance can be determined by LIDAR, UWB, 5G, or a combination thereof. In any of the embodiments herein, the first or second location data can be determined by GPS, UWB, Bluetooth, 4G, 5G, or a combination thereof.

In any of the embodiments herein, the first or second location data can be determined by combining a plurality of location data determined by multiple sensor modalities. In some embodiments, the combining of the multiple sensor modalities determining the first or second location data can be based on a number of sensor modalities, an accuracy associated with a sensor modality, and an element of a Cartesian coordinate location data determined by the sensor modality. In some embodiments, the combining of the multiple sensor modalities determining the first or second location data can be described by:

$$\frac{\sum_{i=1}^{n}\frac{1}{\varepsilon_i^2}c_i}{\sum_{j=1}^{n}\frac{1}{\varepsilon_j^2}}$$

wherein i can be a first index, j can be a second index, n can be the number of sensor modalities, ε can be an accuracy associated with the sensor modality, and c can be the element of the Cartesian coordinate location data determined by the sensor modality. In some embodiments, c can be an x-coordinate, a y-coordinate, or a z-coordinate of the Cartesian coordinate location data.

In some embodiments, an accuracy associated with the combining of the multiple sensor modalities determining the first or second location data can be based on an accuracy associated with a first sensor modality determining the first or second location data and an accuracy associated with a second sensor modality determining the first or second location data. In some embodiments, the accuracy associated with the combining of the multiple sensor modalities determining the first or second location data can be described by:

$$\varepsilon^2 = \cfrac{1}{\cfrac{1}{\varepsilon_i^2} + \cfrac{1}{\varepsilon_j^2}}$$

wherein $\varepsilon$ can be the accuracy associated with the combining of the multiple sensor modalities determining the first or second location data, $\varepsilon_i$ can be the accuracy associated with the first sensor modality determining the first or second location data, and $\varepsilon_j$ can be the accuracy associated with the second sensor modality determining the first or second location data.

In any of the embodiments herein, fusing the data from the first kinematic dataset and the data from the second kinematic dataset to generate the fused dataset can comprise: determining a distance between the first location data of the first vehicle and a second location data of a second vehicle, wherein the second vehicle can be a member of the first pair; determining a difference between a) the distance and b) the first ranging distance data between the first vehicle and the second vehicle; changing the first location data by a first amount, wherein the first amount can be based on the difference, an accuracy associated with the first location data, an accuracy associated with the second location data, and an accuracy associated with the ranging distance data; changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle can be based on the first location data changed by the first amount, and the fused ranging distance data can be based on the ranging distance data changed by the third amount. In some embodiments, the method can further comprise determining a fused second location data of the second vehicle, and a fused distance between the first location data and the second location data.

In some embodiments, the method can be iterative with respect to the steps of changing the first location data, changing the second location data, and changing the ranging distance data. In some embodiments, the iterative method can stop after a predetermined number of iterations. In some embodiments, the iterative method can stop after the fused first location data, the fused second location data, the fused ranging distance data, or the fused distance data reach a threshold floating point accuracy. In some embodiments, an accuracy associated with the fused first location data can be based on the accuracy associated with the first location data, a number of vehicles adjacent to the first vehicle, and the accuracy associated with the ranging distance data. In some embodiments, the accuracy associated with the fused first location data can be described by:

$$\varepsilon_i' = \frac{\varepsilon_i}{\sqrt{n}} + 0.3\frac{1}{n}\sum_1^n \varepsilon_{ij}$$

wherein $\varepsilon_i'$ can be the accuracy associated with the fused first location data, $\varepsilon_i$ can be the accuracy of the first location data, n can be the number of vehicles adjacent to the first vehicle, and $\varepsilon_{ij}$ can be the accuracy associated with the ranging distance data.

In some embodiments, an accuracy associated with the fused ranging distance data can be based on the accuracy associated with the fused first location data, an accuracy associated with the fused second location data, and the accuracy associated with the ranging distance data. In some embodiments, the accuracy associated with the fused ranging distance data can be described by:

$$\varepsilon_{ij}'^2 = \cfrac{1}{\cfrac{1}{\varepsilon_i'^2} + \cfrac{1}{\varepsilon_j'^2} + \cfrac{1}{\varepsilon_{ij}^2}}$$

wherein $\varepsilon_{ij}'$ can be the accuracy of the associated with the fused ranging distance data, $\varepsilon_i'$ can be the accuracy associated with the fused first location data, $\varepsilon_j'$ can be the accuracy associated with the fused second location data, and $\varepsilon_{ij}$ can be the accuracy associated with the ranging distance data. In any of the embodiments herein, the first location data, the second location data, the distance, the ranging distance data, the accuracy associated with the first location data, the accuracy associated with the second location data, the fused first location data, the fused second location data, the fused ranging distance data, the fused distance, the accuracy associated with the fused first location data, the accuracy associated with the fused second location data, or the accuracy associated with the fused ranging distance data can be transmitted between vehicles in the plurality of vehicles.

In some embodiments, the vehicle other than the first vehicle in the plurality of vehicles can transmit the second kinematic dataset to the first vehicle. In some embodiments, the transmitted second kinematic dataset can comprise data describing the first vehicle. In some embodiments, the transmitted second kinematic dataset can comprise data describing a vehicle adjacent to the vehicle other than the first vehicle in the plurality of vehicles. In some embodiments, the transmitted second kinematic dataset can be sent via a radio communication channel. In some embodiments, the radio communication channel can be ultra-wideband.

In any of the embodiments herein, the method can be performed on at least one vehicle in the plurality of vehicles. In any of the embodiments herein, the method can be performed concurrently across multiple vehicles. In any of the embodiments herein, the fused dataset can overwrite the first kinematic dataset or the second kinematic dataset. In any of the embodiments herein, the fused dataset can be stored alongside the first kinematic dataset or the second kinematic dataset.

In some aspects, disclosed herein is a system comprising one or more processors; and a memory communicatively coupled to the one or more processors and configured to store instructions that, when executed by the one or more processors, cause the system to: receive from a sensor on a first vehicle, a first kinematic dataset describing the first vehicle, wherein the first kinematic dataset can comprise a first location data of the first vehicle and a first ranging distance data for a first pair of vehicles comprising the first vehicle; receive a second kinematic dataset describing a plurality of vehicles, wherein the second kinematic dataset can comprise a location data of a vehicle other than the first vehicle in the plurality of vehicles, and; fuse data from the first kinematic data and data from the second kinematic dataset, to generate a fused dataset, wherein the fused dataset can comprise a fused location data of the first vehicle and a fused ranging distance data for the first pair, wherein the fused location data of the first vehicle can have a higher accuracy than the first location data of the first vehicle and the fused ranging distance data for the first pair can have a higher accuracy than the first ranging distance data of the first pair. In some embodiments, the second kinematic dataset can further comprise a second ranging distance data for a second pair of vehicles, not including the first vehicle, in the plurality of vehicles. In any of the embodiments herein, the system can further comprise moving the first vehicle or the vehicle other than the first vehicle in the plurality of vehicles, based on the fused dataset.

In some aspects, disclosed herein are non-transitory computer-readable storage medium storing one or more programs, the one or more programs comprising instructions that, when executed by one or more processors of a system, cause the system to: receive from a sensor on a first vehicle, a first kinematic dataset describing the first vehicle, wherein the first kinematic dataset can comprise a first location data of the first vehicle and a first ranging distance data for a first pair of vehicles comprising the first vehicle; receive a second kinematic dataset describing a plurality of vehicles, wherein the second kinematic dataset can comprise a location data of a vehicle other than the first vehicle in the plurality of vehicles, and; fuse data from the first kinematic data and data from the second kinematic dataset, to generate a fused dataset, wherein the fused dataset can comprise a fused location data of the first vehicle and a fused ranging distance data for the first pair, wherein the fused location data of the first vehicle can have a higher accuracy than the first location data of the first vehicle and the fused ranging distance data for the first pair can have a higher accuracy than the first ranging distance data of the first pair. In some embodiments, the second kinematic dataset can further comprise a second ranging distance data for a second pair of vehicles, not including the first vehicle, in the plurality of vehicles. In any of the embodiments herein, the computer-readable storage-medium can further comprise moving the first vehicle or the vehicle other than the first vehicle in the plurality of vehicles, based on the fused dataset.

BRIEF DESCRIPTION OF THE FIGURES

FIG. 1A depicts a flowchart representing a method for processing sensor data for a plurality of vehicles, in accordance with some embodiments.

FIG. 1B depicts a flowchart representing a method for fusing location data and ranging distance data, in accordance with some embodiments.

DETAILED DESCRIPTION OF THE DISCLOSURE

Figure 2:
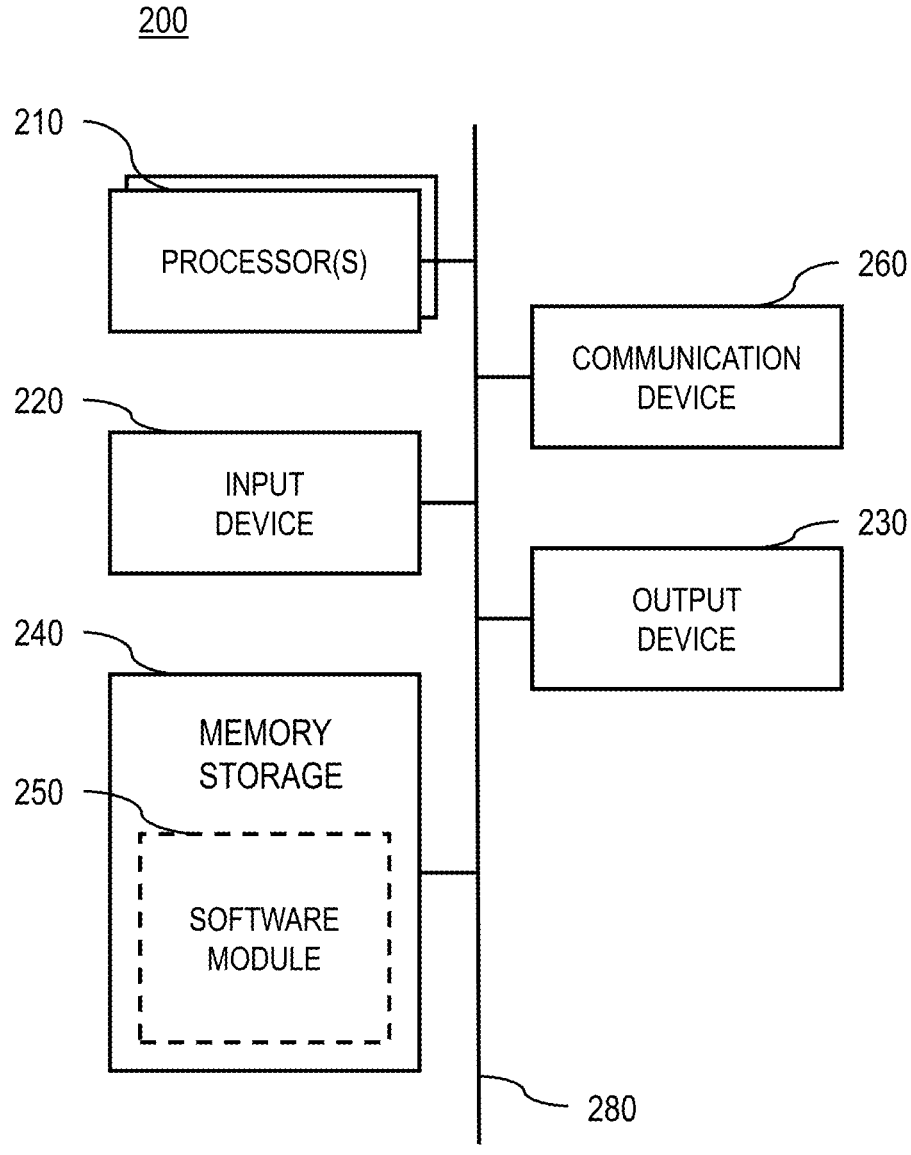
FIG. 2 depicts an exemplary computing device or system, in accordance with some embodiments.

Disclosed herein are systems and methods for processing sensor data for a plurality of vehicles. In some embodiments, a sensor on a given vehicle (the given vehicle referred to for purposes of clarity as the "subject vehicle") receives a kinematic dataset that can include (a) a location data of the subject vehicle and (b) a ranging distance for a pair of vehicles, the pair of vehicles including the subject vehicle. The subject vehicle can also receive an additional kinematic dataset that describes (c) estimated locations of a group of vehicles aside from the given vehicle. The data from the two kinematic datasets can then be combined and processed to generate a single fused dataset. The fused dataset can include a fused location of the subject vehicle, as well as a fused ranging distance for a pair of vehicles for which original ranging distance data was included in one of the kinematic datasets. The fused location of the subject vehicle, as well as the fused ranging distance of the pair of vehicles, can have higher accuracies than the location and ranging distance estimates in one or both of the input kinematic datasets. The fused dataset can be used to control any one or more automated or semi-automated functionalities (e.g., including causing movement) of any of the vehicles in the group of vehicles of which the subject vehicle is a member.

Definitions

Unless otherwise defined, all of the technical terms used herein have the same meaning as commonly understood by one of ordinary skill in the art in the field to which this disclosure belongs.

As used in this specification and the appended claims, the singular forms "a", "an", and "the" include plural references unless the context clearly dictates otherwise. Any reference to "or" herein is intended to encompass "and/or" unless otherwise stated.

"About" and "approximately" shall generally refer to values or ranges that are within an acceptable degree of a given value or given range, given the nature of the measurement and/or use case, for example within 20 percent (%), typically, within 10%, and more typically, within 5% of the given value or range of values.

As used herein, the terms "comprising" (and any form or variant of comprising, such as "comprise" and "comprises"), "having" (and any form or variant of having, such as "have" and "has"), "including" (and any form or variant of including, such as "includes" and "include"), or "containing" (and any form or variant of containing, such as "contains" and "contain"), are inclusive or open-ended and do not exclude additional, un-recited additives, components, integers, elements, or method steps.

The section headings used herein are for organizational purposes only and are not to be construed as limiting the subject matter described.

Methods for Processing Sensor Data for a Plurality of Vehicles

Control systems for controlling navigation (or other automated functionalities) of automated or semi-automated vehicles may rely on accurate estimates of vehicle kinematics. Acquiring such accurate estimates, however, can be challenging. For example, a given sensor or transmission can be compromised by instrumental noise, and accordingly, can convey an inaccurate value. To improve on the accuracy of vehicles' kinematics estimates, data from a sensor and/or transmission can be fused with other data. The methods and systems disclosed herein leverage an algorithm for fusing input data in order to generate highly accurate kinematics estimates, where the accuracy of the output kinematics data is significantly improved as compared to the prevision of the input data. Accurate kinematics estimates generated in this manner can be used to improve the control of the vehicles whose kinematics are represented by the fused data (and/or to improve control of other vehicles in the vicinity of those vehicles). As described herein, the methods and systems disclosed herein may be particularly applicable to vehicles operating in a group.

FIG. 1A illustrates a flow chart showing a method 100 for processing sensor data for a plurality of vehicles. Method 100 can be performed, for example, using one or more electronic devices (e.g., one or more processor-based devices) implementing a software platform. In some examples, method 100 is performed using a client-server system, and the blocks of method 100 are divided up in any suitable manner between the server and a client device. In other examples, the blocks of method 100 are divided up between the server and multiple client devices. Thus, while portions of method 100 are described herein as being performed by particular devices of a client-server system, it will be appreciated that method 100 is not so limited. In other examples, method 100 is performed using only a client device or only multiple client devices. In method 100, some blocks are, optionally, combined, the order of some blocks is, optionally, changed, and some blocks are, optionally, omitted. In some examples, additional steps may be performed in combination with the method 100. Accordingly, the operations as illustrated (and described in greater detail below) are exemplary by nature and, as such, should not be viewed as limiting.

At step 102 in FIG. 1A, a first kinematic dataset describing the first vehicle is received. The first kinematic dataset may comprise (a) a first location data of the first vehicle and (b) a first ranging distance data for a first pair of vehicles comprising the first vehicle. In some embodiments, the first kinematic dataset being received is received by a vehicle, such as the subject vehicle, and/or a central server.

In some instances, the first kinematic dataset can comprise a time at which the first kinematic dataset is received. The time can be a relative time, such as, but not limited to, the amount of time elapsed since the Unix epoch, where the Unix epoch is 00:00:00 UTC on Jan. 1, 1970. Alternatively, the relative time can be the amount of time elapsed since an event that has been observed by a sensor from a vehicle, in the plurality of vehicles. Alternatively, the relative time can be the amount of time elapsed since the vehicle receiving data from the first kinematic dataset last received data from another vehicle. The relative time can be a negative value or a positive value. The time can an absolute time, such as the local time, expressed in terms of the local time zone, wherein the local time zone is the time zone local to the location of the vehicle in the plurality of vehicles, or the time zone local to an operator or a central server that can, in part, control or monitor at least one vehicle in the plurality of vehicles. Alternatively, the absolute time can be the absolute time expressed in the UTC or GMT time zone, regardless of the location of any vehicle in the plurality of vehicles, or a central controller or external monitor of a vehicle in the plurality of vehicles.

In any of the instances herein, the first kinematic dataset can further comprise a first acceleration, a first velocity, or a first displacement of the first vehicle. The first acceleration can describe the rate of change of the velocity for a vehicle in the plurality of vehicles. The first velocity can describe the rate of change of the displacement for a vehicle in the plurality of vehicles. The first displacement can describe the change of the position or location for a vehicle in the plurality of vehicles. In some instances, the rate of change for the above kinematic parameters can be zero or approximately zero. As used herein, in some instances, a kinematic dataset can comprise variables that do not change with respect to time, or do not suggest that the first vehicle is in motion. For example, the first kinematic dataset can comprise the time at which an event happened, or the mass of the vehicle. These data can be used to compute other values (which may be referred to as kinematic data or kinematic values), such as values that describe the first vehicle, while in motion, e.g., the momentum or acceleration of the vehicle.

In any of the instances herein, the first acceleration or second acceleration can be determined by an inertial measurement unit (IMU). In addition to a vehicle's acceleration, the IMU can also report the vehicle's specific force, angular rate, and/or orientation, via accelerometers, gyroscopes, magnetometers, and/or a combination thereof.

In any of the instances herein, the first velocity or second velocity can be determined by a global positioning system (GPS), ultra-wideband (UWB), Bluetooth, 4G, 5G, or a combination thereof. In any of the instances herein, the first displacement or second displacement can be determined by GPS, UWB, Bluetooth, 4G, 5G, or a combination thereof. In some instances, the first or second location data can be determined by GPS, UWB, Bluetooth, 4G, 5G, or a combination thereof. GPS can be a satellite-based radio navigation system, UWB can be a radio technology for short-range high-bandwidth communications over a part of the radio spectrum. 4G and 5G can respectively refer to the $4^{th}$ generation or the $5^{th}$ generation of a technology standard used for broadband cellular networks. In addition to 4G and 5G, kinematics data about a vehicle in the plurality of vehicles can be based on previous generations of the digital technology standard for broadband cellular networks, such as 2G, or 3G.

In some instances, the first, second, or fused ranging distance can be determined by LIDAR, UWB, 5G, or a combination thereof. LIDAR, or "light detection and ranging" can refer to a method for determining ranges e.g., the distance or slant range between two objects, by targeting an object or surface with a laser and measuring the time of flight for the reflected light to return to the sender. LIDAR can operate in a fixed direction, or it can scan in multiple directions, for example, in sequence, such that multiple instances of lasers are shown at various angles, and their respective returning times of flight are measured. The first kinematics dataset can comprise a myriad of kinematics parameters, and the parameters can be obtained via various technologies.

At step 104 in FIG. 1A, a second kinematic dataset describing a plurality of vehicles is received. The second kinematic dataset comprises a location data of a second vehicle in the plurality of vehicles.

The second vehicle in the plurality of vehicles can be a vehicle that neighbors the first vehicle (e.g., in an adjacent lane, on an adjacent roadway, in an adjacent position in a multi-vehicle formation, and/or within a predetermined distance), such that by being neighbors with the first vehicle, the vehicle is within range to send data to the first vehicle.

In some instances, the second kinematic dataset can comprise data received from a sensor on the second vehicle in the plurality of vehicles. The sensor can be, but is not limited to, an IMU unit comprising an accelerometer, a gyroscope, a magnetometer, and/or a camera.

The second kinematic dataset can comprise data determined by the second vehicle in the plurality of vehicles. The data determined by the vehicle other the first vehicle can derive from measurements that were not directly acquired by a sensor on the vehicle. That is, the data may not comprise a direct measurement of the kinematics parameters, such as a vehicle's location, and may instead—or additionally—comprise data from which the location of the one or more vehicles can be derived, e.g., via computations. For example, the input kinematics data can include a vehicle's speed, acceleration, and duration of time during travel, from which the vehicle's location can be inferred.

In the case that multiple sources of information exist for a particular kinematic parameter (e.g., a neighboring vehicle in the group detects and transmits an estimate of the subject vehicle's speed, and the subject vehicle also has data from one of its own onboard sensors that estimates its speed), methods known to skilled persons in the art can be used to combine the different input streams, to generate an estimate that is more accurate than the input value, and the improved estimate can be used to compute or infer a downstream kinematics parameter, such as an estimate of the vehicle's location. In some instances, the second kinematic dataset can further comprise a second ranging distance data for a second pair of vehicles, not including the first vehicle, in the plurality of vehicles. The second ranging distance data can describe a pair of vehicles that includes the first vehicle, but the second ranging distance can alternatively describe a pair of vehicles that comprises neither the vehicle receiving the data nor the vehicle sending the data.

In some instances, the second vehicle in the plurality of vehicles can transmit the second kinematic dataset to the first vehicle. In some instances, the transmitted second kinematic dataset can comprise data describing the first vehicle. In some instances, the transmitted second kinematic dataset can comprise data describing a vehicle adjacent to the second vehicle in the plurality of vehicles. In some instances, the transmitted second kinematic dataset can be sent via a radio communication channel. In some instances, the radio communication channel can be ultra-wideband.

In some instances, the second kinematic dataset can comprise a time at which the first kinematic dataset is received. The time can be a relative time, such as, but not limited to, the amount of time elapsed since the Unix epoch, where the Unix epoch is 00:00:00 UTC on Jan. 1, 1970. Alternatively, the relative time can be the amount of time elapsed since an event that has been observed by a sensor from a vehicle, in the plurality of vehicles. Alternatively, the relative time can be the amount of time elapsed since the vehicle receiving data from the second kinematic dataset last received data from another vehicle. The relative time can be a negative value or a positive value. The time can an absolute time, such as the local time, expressed in terms of the local time zone, wherein the local time zone is the time zone local to the location of the vehicle in the plurality of vehicles, or the time zone local to an operator or a central server that can, in part, control or monitor at least one vehicle in the plurality of vehicles. Alternatively, the absolute time can be the absolute time expressed in the UTC or GMT time zone, regardless of the location of any vehicle in the plurality of vehicles, or a central controller or external monitor of a vehicle in the plurality of vehicles.

In any of the instances herein, the second kinematic dataset can further comprise a second acceleration, a second velocity, or a second displacement of the second vehicle. The second acceleration can describe the rate of change of the velocity for a vehicle in the plurality of vehicles. The second velocity can describe the rate of change of the displacement for a vehicle in the plurality of vehicles. The second displacement can describe the rate of change of the position for a vehicle in the plurality of vehicles. In some instances, the rate of change for the above kinematic parameters can be zero or approximately zero. As used herein, in some instances, a kinematic dataset can comprise variables that do not change with respect to time, or do not suggest that the second vehicle is in motion. For example, the second kinematic dataset can comprise the time at which an event happened, or the mass of the vehicle. These data can be used to compute other values (which may be referred to as kinematic data or kinematic values), such as values that describe the second vehicle, while in motion, e.g., the momentum or acceleration of the vehicle.

At step 106 in FIG. 1A, data from the first kinematic dataset and data from the second kinematic dataset, is fused, to generate a fused dataset. The fused dataset comprises a fused location data of the first vehicle and a fused ranging distance data for the first pair, wherein the fused location data of the first vehicle has a higher accuracy than the first location data of the first vehicle and the fused ranging distance data for the first pair has a higher accuracy than the first ranging distance data of the first pair.

In some instances, the first or second location data can be determined by combining a plurality of location data determined by multiple sensor modalities. This combining step is prior to the fusion operation that fuses the location data with the ranging distance data. In some instances, the combining of the multiple sensor modalities determining the first or second location data can be based on a number of sensor modalities, an accuracy associated with a sensor modality, and an element of a Cartesian coordinate location data determined by the sensor modality. In some instances, the combining of the multiple sensor modalities determining the first or second location data can be based on a number of sensor modalities, an accuracy associated with a sensor modality, and an element of a Cartesian coordinate location data determined by the sensor modality. For example, multiple sensors—either multiple devices of the same sensor modality, or multiple sensors of at least two different sensor modalities—can be used to estimate a parameter of interest for the vehicle, such as the vehicle's position, e.g., Cartesian coordinate. In such a case, the estimates of e.g., the vehicle's position from the multiple sensor modalities, e.g., multiple sensor modalities can be combined. In some instances, the combining of the multiple sensor modalities determining the first or second location data can be described by:

$$\frac{\sum_{i=1}^{n} \frac{1}{\varepsilon_i^2} c_i}{\sum_{j=1}^{n} \frac{1}{\varepsilon_j^2}}$$

wherein i is a first index, j is a second index, n is the number of sensor modalities, $\varepsilon$ is the accuracy associated with the sensor modality, and c is the element of the Cartesian coordinate location data determined by the sensor modality. In some instances, c is an x-coordinate, a y-coordinate, or a z-coordinate of the Cartesian coordinate location data. Multiple sensors or determinations (e.g., computations) may yield measurements or estimates for a kinematic value, e.g., the speed of a particular vehicle. For example, the location of a vehicle may be ascertained directly by a sensor on the vehicle, in addition to being determined or computed by considering the vehicle's heading and displacement from a known prior location. For such an example, both the sensor-observed location, as well as the computed location, can be combined, according to the above formula.

In some instances, an accuracy associated with the combining of the multiple sensor modalities determining the first or second location data is based on an accuracy associated with a first sensor modality determining the first or second location data and an accuracy associated with a second sensor modality determining the first or second location data. In some instances, the accuracy associated with the combining of the multiple sensor modalities determining the first or second location data is described by:

$$\varepsilon^2 = \frac{1}{\frac{1}{\varepsilon_i^2} + \frac{1}{\varepsilon_j^2}}$$

wherein $\varepsilon$ is the accuracy associated with the combining of the multiple sensor modalities determining the first or second location data, $\varepsilon_i$ is the accuracy associated with the first sensor modality determining the first or second location data, and $\varepsilon_j$ is the accuracy associated with the second sensor modality determining the first or second location data. As described above, multiple sensors or determinations may yield measurements or estimates for a kinematic value, e.g., the speed of a particular vehicle. For example, the location of a vehicle may be ascertained directly by a sensor on the vehicle, in addition to being determined or computed by considering the vehicle's heading and displacement from a known prior location. For such an example, both the sensor-observed location, as well as the computed location, can be fused, according to the previously described formula. By extension, the accuracy of the fused location can also be derived from fusing the respective accuracies associated with each input estimation of the vehicle's location.

In some instances, fusing the data from the first kinematic dataset and the data from the second kinematic dataset to generate the fused dataset comprises: determining a distance between the first location data of the first vehicle and a second location data of a second vehicle, wherein the second vehicle is a member of the first pair; determining a difference between (a) the distance and (b) the first ranging distance data between the first vehicle and the second vehicle; changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle is based on the first location data changed by the first amount, and the fused ranging distance data is based on the ranging distance data changed by the third amount.

FIG. 1B illustrates a flow chart showing a method 108 for fusing location data with ranging distance data. Method 108 can be a subprocess of the data fusing depicted in 106 of FIG. 1A. Method 108 can be performed, for example, using one or more electronic devices (e.g., one or more processor-based devices) implementing a software platform. In some examples, method 108 is performed using a client-server system, and the blocks of method 108 are divided up in any suitable manner between the server and a client device. In other examples, the blocks of method 108 are divided up between the server and multiple client devices. Thus, while portions of method 108 are described herein as being performed by particular devices of a client-server system, it will be appreciated that method 108 is not so limited. In other examples, method 108 is performed using only a client device or only multiple client devices. In method 108, some blocks are, optionally, combined, the order of some blocks is, optionally, changed, and some blocks are, optionally, omitted. In some examples, additional steps may be performed in combination with the method 108. Accordingly, the operations as illustrated (and described in greater detail below) are exemplary by nature and, as such, should not be viewed as limiting.

At step 110 in FIG. 1B, a distance between the first location data of the first vehicle and a second location of a second vehicle is determined.

The distance between the locations of the first and second vehicle can be determined by computing the Euclidean distance between the two locations. The distance can be distance data, e.g., an estimate or a computation representing the distance between the first and second vehicles, and not necessarily the exact distance between the two vehicles. Accordingly, a change in the distance data need not correspond to a change in the physical locations of the first and second vehicles. The determined distance is derived from location data, and accordingly, a change in the determined distance need not reflect any actual change in the vehicle's locations.

At step 112 in FIG. 1B, a difference between a) the determined distance and b) the first ranging distance data between the first vehicle and the second vehicle is determined.

The first ranging distance data can be determined by a sensor based on a technology or a combination of technologies, such as, but not limited to, LIDAR, 5G, or UWB technologies. Changes in the first ranging distance data need not correspond to a change in the physical distance between the first and second vehicles. Similarly, the difference between the distance according to the vehicles' location data and the ranging distance is a difference data. Changes in the difference data need not correspond to a change in the physical locations of the first and second vehicles.

At step 114 in FIG. 1B, the first location data is adjusted by a first amount, where the first amount is based on the determined difference (at block 112), an accuracy associated with the first location data, an accuracy associated with the second location data, and an accuracy associated with the ranging distance data.

The adjustment of the first location data by a first amount need not correspond to a change in the physical location of a vehicle. The first amount can be a positive or negative value. The first amount can be a real number, such as an integer, a fraction, a natural number and/or an irrational number. Adjusting the first location data can comprise overwriting the first location data. Alternatively, adjusting the first location data can comprise saving the adjusted first location data alongside the unadjusted first location data.

The saving of the first location data can be in the memory or storage of a vehicle, and/or a central server. The first location data adjusted by the first amount can be referred to as the fused first location data.

The accuracy values, e.g., the accuracy associated with the first location data, the accuracy associated with the second location data, and the accuracy associated with the ranging distance data, can be derived from metadata, wherein the values comprised in the metadata are generated in real time, or can derive from a lookup table, based on known parameters. The kinematic datasets can comprise accuracy values associated with the kinematic parameter values comprised in the kinematic datasets.

At step 116 in FIG. 1B, the second location data is adjusted by a second amount, where the second amount is based on the determined difference (at block 112), an accuracy associated with the first location data, an accuracy associated with the second location data, and an accuracy associated with the ranging distance data.

The adjustment of the second location data by the second amount need not correspond to a change in the physical location of a vehicle. The second amount can be a positive or negative value. The second amount can be a real number, such as an integer, a fraction, a natural number and/or an irrational number. Adjusting the second location data can comprise overwriting the second location data. Alternatively, adjusting the second location data can comprise saving the adjusted second location data alongside the unadjusted second location data. The saving of the second location data can be in the memory or storage of a vehicle, and/or a central server. The second location data adjusted by the second amount can be referred to as the fused second location data.

At step 118 in FIG. 1B, the ranging distance data is adjusted by a third amount, where the third amount is based on the determined difference (at block 112), the accuracy associated with the ranging distance data, the accuracy associated with the first location data, and the accuracy associated with the second location data. Accordingly, the fused location data of the first vehicle is based on the first location data adjusted by the first amount, and the fused ranging distance data is based on the ranging distance data adjusted by the third amount.

The adjustment of the ranging distance data by the third amount need not correspond to a change in the physical location of a vehicle, and/or a change in the relative distance between two vehicles. The third amount can be a positive or negative value. The third amount can be a real number, such as an integer, a fraction, a natural number and/or an irrational number. Adjusting the ranging distance data can comprise overwriting the ranging distance data. Alternatively, adjusting the ranging distance data can comprise saving the adjusted ranging distance data alongside the unadjusted ranging distance data. The saving of the ranging distance data can be in the memory or storage of a vehicle, and/or a central server. The ranging distance data adjusted by the third amount can be referred to as the fused ranging distance data.

In some instances, the method can further comprise determining a fused second location data of the second vehicle, and a fused distance between the first location data and the second location data. The fused second location data can be determined via a method used for determining the fused first location data, except that the second location data is used instead of the first location data, when determining the fused second location data. The fused distance can be the Euclidean distance between the fused first location data of the first vehicle and the fused second location data of the second vehicle.

Arrow 120 in FIG. 1B represents an iteration, where performing step 118 can be followed by performing step 110, followed by steps 112-118.

The fused location data of the first vehicle being based on the first location adjusted by the first amount can refer to the fused location data deriving from the first location adjusted by the first amount after some number of iterations, including one iteration. That is, the fused location data of the first vehicle can be a function of, or alternatively, can be, the first location data adjusted by the first amount. Similarly, the fused ranging distance data being based on the ranging distance data adjusted by the third amount can refer to the fused ranging distance data deriving from the fused ranging distance data adjusted by the third amount after some number of iterations, including one iteration. That is, the fused ranging distance data of the first vehicle can be a function of, or alternatively, can be, the ranging distance data adjusted by the third amount. In some instances, the method is iterative with respect to the steps of adjusting the first location data, adjusting the second location data, and adjusting the ranging distance data. In some instances, the iterative method can stop after a predetermined number of iterations. The predetermined number of iterations can be five iterations. In some instances, the iterative method can stop after the fused first location data, the fused second location data, the fused ranging distance data, or the fused distance data reach a threshold floating point accuracy. The threshold floating point accuracy can be two or double.

In some instances, an accuracy associated with the fused first location data is based on the accuracy associated with the first location data, a number of vehicles adjacent to the first vehicle, and the accuracy associated with the ranging distance data. In some instances, the accuracy associated with the fused first location data can be described by:

$$\varepsilon_i' = \frac{\varepsilon_i}{\sqrt{n}} + 0.3 \frac{1}{n} \sum_1^n \varepsilon_{ij}$$

wherein $\varepsilon_i'$ is the accuracy associated with the fused first location data, $\varepsilon_i$ is the accuracy of the first location data, n is the number of vehicles adjacent to the first vehicle, and $\varepsilon_{ij}$ is the accuracy associated with the ranging distance data. The above formula describing the accuracy associated with the fused first location data can also describe the accuracy associated with the fused second location data.

In some instances, an accuracy associated with the fused ranging distance data is based on the accuracy associated with the fused first location data, an accuracy associated with the fused second location data, and the accuracy associated with the ranging distance data. In some instances, the accuracy associated with the fused ranging distance data is described by:

$$\varepsilon_{ij}'^2 = \frac{1}{\frac{1}{\varepsilon_i'^2} + \frac{1}{\varepsilon_j'^2} + \frac{1}{\varepsilon_{ij}^2}}$$

wherein $\varepsilon_{ij}'$ is the accuracy of the associated with the fused ranging distance data, $\varepsilon_i'$ is the accuracy associated with the fused first location data, $\varepsilon_j'$ is the accuracy associated with the fused second location data, and $\varepsilon_{ij}$ is the accuracy associated with the ranging distance data.

In some instances, the first location data, the second location data, the distance, the ranging distance data, the accuracy associated with the first location data, the accuracy associated with the second location data, the fused first location data, the fused second location data, the fused ranging distance data, the fused distance, the accuracy associated with the fused first location data, the accuracy associated with the fused second location data, or the accuracy associated with the fused ranging distance data can be transmitted between vehicles in the plurality of vehicles.

In some instances, the fused dataset can overwrite the first kinematic dataset or the second kinematic dataset. In some instances, the fused dataset can be stored alongside the first kinematic dataset or the second kinematic dataset. The stored fused dataset can be stored on a vehicle different from the vehicle storing the first kinematic dataset or the second kinematic dataset. The stored fused dataset can be stored long term on a storage drive, or temporarily, in memory.

In some instances, the fused dataset can be a first fused dataset, and the second kinematic dataset can comprise data from a second fused dataset. In some instances, the second fused dataset can be determined by the second vehicle in the plurality of vehicles. The first or second fused dataset can act as inputs that are transmitted to one or more other vehicles, and/or that are used (e.g., iteratively) for further fusion, such as a fusion operation carried out by a one or more processors of another vehicle. In some embodiments, the first or second fused dataset can be used as inputs for further fusion done by the same vehicle. The first or second fused dataset can act as inputs for further fusion iterations until a condition is met, such as, but not limited to, the fused dataset being iteratively fused some number of times, a data criteria (e.g., accuracy criteria) is met, a certain amount of processing resources are used, a certain amount of processing time passes, a certain amount of memory is used, and/or a vehicle in the plurality of vehicles is powered down or ceases to operate as expected.

In any of the instances herein, the method can further comprise moving the first vehicle or the second vehicle in the plurality of vehicles, based on the fused dataset. Moving the first vehicle or the second vehicle can comprise providing a command to move the vehicle to a target location, a command to move the vehicle for a target amount of time, while the vehicle moves at a target speed and/or acceleration, or a command to move the vehicle for a target distance, as measured by an instrument, such as an odometer. The vehicle may not move within the approximate range of the target parameters, depending on mechanical and environmental constraints and obstacles encountered by the vehicle. Moving the vehicle may be regulated by a control system known to a person skilled in the art, such as, but not limited to, a proportional-integral-derivative (PID) controller, and the parameters for the controller can be tuned according to known methods in the art, such as, but not limited to the Ziegler-Nichols method, or a statistical method, such as a machine learning method.

In some instances, all or part of method 100 (e.g., generating fused data) can be performed at a regular interval. In some instances, the regular interval can be 500 ms. The regular interval need not be a value that is fixed for the entirety of a vehicle's operation. The regular interval can change after the method is performed at least one time. Different vehicles in the plurality of vehicles can perform the methods disclosed herein at different regular intervals. The performance of the disclosed methods at a regular interval for one vehicle need not occur in synchrony with another vehicle in the plurality of vehicles.

In any of the instances described herein, method 100 can be performed on at least one vehicle in the plurality of vehicles. In any of the instances described herein, the method can be performed concurrently across multiple vehicles. Multiple vehicles can perform the methods described herein, such as the fusion of the input sensor or transmitted data, concurrently (e.g., in parallel). The fusion operations for one vehicle need not commence or end at the same time or approximately the same time as the fusion operations for another vehicle in the plurality. The fusion operations performed on a vehicle in the plurality can start or end during the middle of another vehicle's performing of their own respective fusion operations. The fusion operations for one vehicle in the plurality can, if necessary, be timed such that the duration of performing the vehicle's fusion operations does not overlap with another vehicle's performing of its own respective fusion operations. For example, the timing of performing the fusion operations for one vehicle can be sequential with respect to another vehicle's performing of its own fusion operations. The fusion operations for one vehicle also need not take the same amount of time as those of another vehicle in the plurality. The methods disclosed herein does not need the respective clocks across the vehicles in the plurality to be synchronized. The aforementioned flexibilities in performing the fusion operations across vehicles allows for distributed and efficient computations, when increasing the accuracy of the kinematic dataset values, relative to the values of the input data.

Systems for Processing Sensor Data for a Plurality of Vehicles

Also disclosed herein are systems designed to implement any of the disclosed methods for processing sensor data for a plurality of vehicles. The systems may comprise, e.g., one or more processors, and a memory unit communicatively coupled to the one or more processors and configured to store instructions that, when executed by the one or more processors, cause the system to perform all or part of any of the methods described herein, and/or to: receive from a sensor on a first vehicle, a first kinematic dataset describing the first vehicle, wherein the first kinematic dataset can comprise a first location data of the first vehicle and a first ranging distance data for a first pair of vehicles comprising the first vehicle; receive a second kinematic dataset describing a plurality of vehicles, wherein the second kinematic dataset can comprise a location data of a vehicle other than the first vehicle in the plurality of vehicles, and; fuse data from the first kinematic data and data from the second kinematic dataset, to generate a fused dataset, wherein the fused dataset can comprise a fused location data of the first vehicle and a fused ranging distance data for the first pair, wherein the fused location data of the first vehicle can have a higher accuracy than the first location data of the first vehicle and the fused ranging distance data for the first pair can have a higher accuracy than the first ranging distance data of the first pair. In some instances, the second kinematic dataset can further comprise a second ranging distance data for a second pair of vehicles, not including the first vehicle, in the plurality of vehicles. In some instances, the system can further comprise moving the first vehicle or the vehicle other than the first vehicle in the plurality of vehicles, based on the fused dataset.

Also disclosed herein are non-transitory computer-readable storage medium storing one or more programs, the one or more programs comprising instructions that, when executed by one or more processors of a system, cause the system to: receive from a sensor on a first vehicle, a first kinematic dataset describing the first vehicle, wherein the first kinematic dataset can comprise a first location data of the first vehicle and a first ranging distance data for a first pair of vehicles comprising the first vehicle; receive a second kinematic dataset describing a plurality of vehicles, wherein the second kinematic dataset can comprise a location data of a vehicle other than the first vehicle in the plurality of vehicles, and; fuse data from the first kinematic data and data from the second kinematic dataset, to generate a fused dataset, wherein the fused dataset can comprise a fused location data of the first vehicle and a fused ranging distance data for the first pair, wherein the fused location data of the first vehicle can have a higher accuracy than the first location data of the first vehicle and the fused ranging distance data for the first pair can have a higher accuracy than the first ranging distance data of the first pair. In some instances, the second kinematic dataset can further comprise a second ranging distance data for a second pair of vehicles, not including the first vehicle, in the plurality of vehicles. In some instances, the computer-readable storage-medium can further comprise moving the first vehicle or the vehicle other than the first vehicle in the plurality of vehicles, based on the fused dataset.

Computer Systems and Networks

FIG. 2 illustrates an example of a computing device or system in accordance with one embodiment. Device 200 can be a host computer connected to a network. Device 200 can be a client computer or a server. As shown in FIG. 2, device 200 can be any suitable type of microprocessor-based device, such as a personal computer, work station, server or handheld computing device (portable electronic device) such as a phone or tablet. The device can include, for example, one or more processor(s) 210, input devices 220, output devices 230, memory or storage devices 240, communication devices 260, and nucleic acid sequencers 270. Software 250 residing in memory or storage device 240 may comprise, e.g., an operating system as well as software for executing the methods described herein. Input device 220 and output device 230 can generally correspond to those described herein, and can either be connectable or integrated with the computer.

Input device 220 can be any suitable device that provides input, such as a touch screen, keyboard or keypad, mouse, or voice-recognition device. Output device 230 can be any suitable device that provides output, such as a touch screen, haptics device, or speaker.

Storage 240 can be any suitable device that provides storage (e.g., an electrical, magnetic or optical memory including a RAM (volatile and non-volatile), cache, hard drive, or removable storage disk). Communication device 260 can include any suitable device capable of transmitting and receiving signals over a network, such as a network interface chip or device. The components of the computer can be connected in any suitable manner, such as via a wired media (e.g., a physical system bus 280, Ethernet connection, or any other wire transfer technology) or wirelessly (e.g., Bluetooth®, Wi-Fi®, or any other wireless technology).

Software module 250, which can be stored as executable instructions in storage 240 and executed by processor(s) 210, can include, for example, an operating system and/or the processes that embody the functionality of the methods of the present disclosure (e.g., as embodied in the devices as described herein).

Software module 250 can also be stored and/or transported within any non-transitory computer-readable storage medium for use by or in connection with an instruction execution system, apparatus, or device, such as those described herein, that can fetch instructions associated with the software from the instruction execution system, apparatus, or device and execute the instructions. In the context of this disclosure, a computer-readable storage medium can be any medium, such as storage 240, that can contain or store processes for use by or in connection with an instruction execution system, apparatus, or device. Examples of computer-readable storage media may include memory units like hard drives, flash drives and distribute modules that operate as a single functional unit. Also, various processes described herein may be embodied as modules configured to operate in accordance with the embodiments and techniques described above. Further, while processes may be shown and/or described separately, those skilled in the art will appreciate that the above processes may be routines or modules within other processes.

Software module 250 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Figure 3:
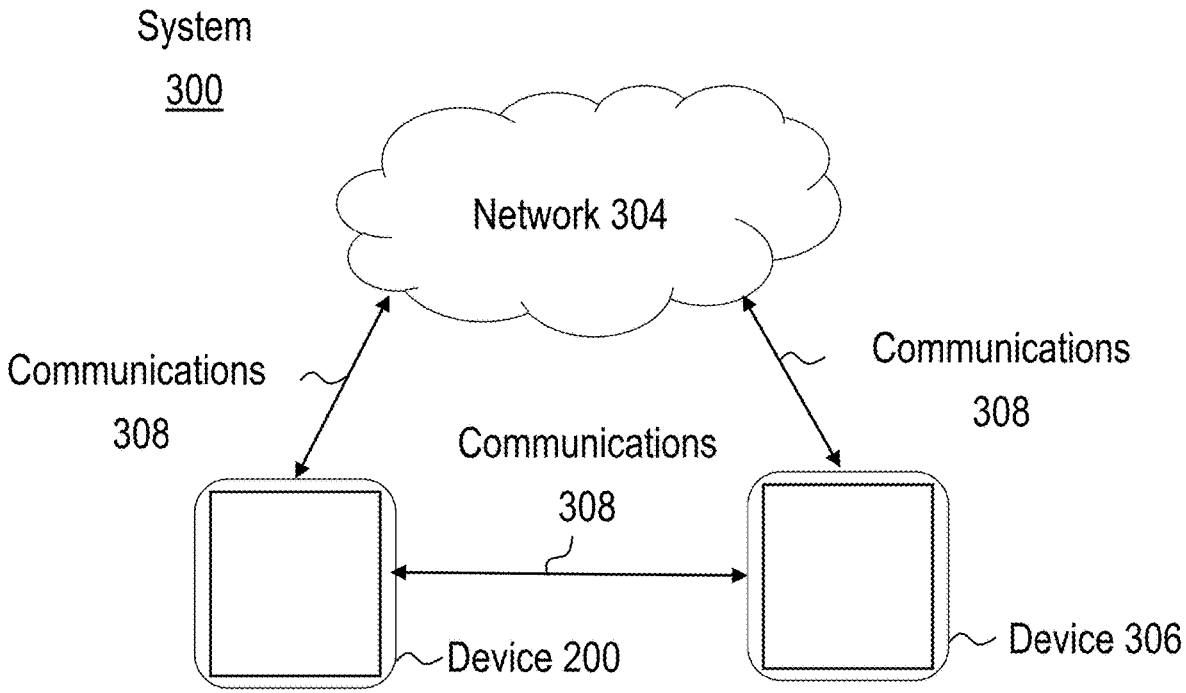
FIG. 3 depicts an exemplary computer system or computer network, in accordance with some embodiments.

Device 200 may be connected to a network (e.g., network 304, as shown in FIG. 3 and/or described below), which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 200 can be implemented using any operating system, e.g., an operating system suitable for operating on the network. Software module 250 can be written in any suitable programming language, such as C, C++, Java, R, or Python. In various embodiments, application software embodying the functionality of the present disclosure can be deployed in different configurations, such as in a client/server arrangement or through a Web browser as a Web-based application or Web service, for example. In some embodiments, the operating system is executed by one or more processors, e.g., processor(s) 210.

FIG. 3 illustrates an example of a computing system in accordance with one embodiment. In system 300, device 300 (e.g., as described above and illustrated in FIG. 2) is connected to network 304, which is also connected to device 306.

Device 200 and 306 may communicate, e.g., using suitable communication interfaces via network 304, such as a Local Area Network (LAN), Virtual Private Network (VPN), or the Internet. In some embodiments, network 404 can be, for example, the Internet, an intranet, a virtual private network, a cloud network, a wired network, or a wireless network. Devices 200 and 306 may communicate, in part or in whole, via wireless or hardwired communications, such as Ethernet, IEEE 802.11b wireless, or the like. Additionally, devices 200 and 306 may communicate, e.g., using suitable communication interfaces, via a second network, such as a mobile/cellular network. Communication between devices 200 and 306 may further include or communicate with various servers such as a mail server, mobile server, media server, telephone server, and the like. In some embodiments, Devices 300 and 306 can communicate directly (instead of, or in addition to, communicating via network 304), e.g., via wireless or hardwired communications, such as Ethernet, IEEE 802.11b wireless, or the like. In some embodiments, devices 200 and 306 communicate via communications 308, which can be a direct connection or can occur via a network (e.g., network 304).

One or all of devices 200 and 306 generally include logic (e.g., http web server logic) or are programmed to format data, accessed from local or remote databases or other sources of data and content, for providing and/or receiving information via network 304 according to various examples described herein.

Example 1—Sensor Fusion Results in Improved Accuracy

Figure 4:
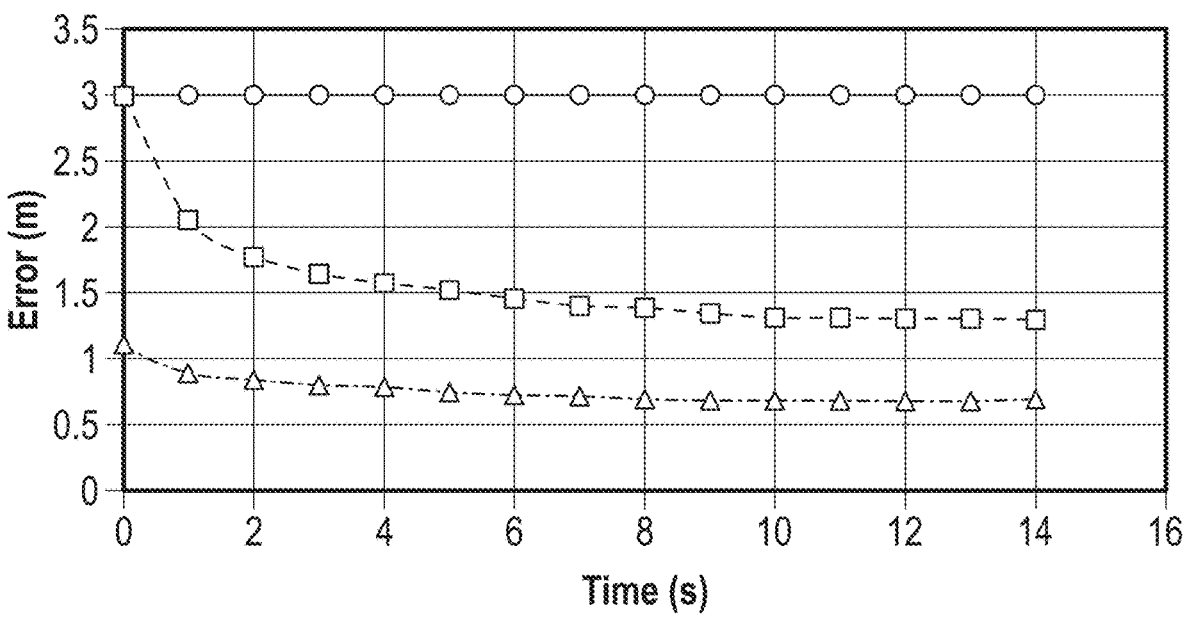
FIG. 4 depicts data comparing the accuracy resulting from fusing kinematics data versus the accuracy of unfused kinematics data, in accordance with some embodiments.

FIG. 4 depicts the accuracy in the location positioning of a vehicle, over time. The y-axis depicts the accuracy in the location positioning in meters, and the x-axis depicts the elapsed time in seconds. The accuracy in the location positioning of a vehicle over time is compared across three different embodiments of sensor fusion. The first embodiment comprises fusing sensor data across GPS, 5G, INS, and UWB, and the accuracy over time for this sensor fusion combination is depicted in FIG. 4 as the darkest grey glyph. The second embodiment comprises fusing sensor data cross GPS and INS, and the accuracy over time for this sensor fusion combination is depicted in FIG. 4 as the medium grey glyph. The third embodiment does not comprise any fused sensor data. Only GPS-derived data is used. The accuracy over time for the non-fusion sensor data is depicted in FIG. 4 as the lightest grey glyph. For the entirety of the observed duration, the fusion of the GPS, 5G, INS, and UWB data exhibits the best accuracy, followed by the fusion of the GPS and INS data, which exhibits the second best error across the observed duration, and the non-fused GPS data exhibiting the worst accuracy across the observed duration. In fact, unlike the accuracies deriving from the fused sensor data, the non-fused GPS data fails to show an improvement in accuracy over time. At the final observed timepoint, e.g., when the location errors are lowest for all of the three different embodiments of sensor fusion, the fusion of the GPS, 5G, INS, and UWB data exhibits an error of 0.6 m, whereas the fusion of the GPS and INS data exhibits an error of 1.3 m. The non-fused GPS-only data exhibits an error of 3.0 m. In other words, the fusion of the GPS, 5G, INS, and UWB data provides an approximately 54% reduction in the location error, compared to traditional fusion methods, such as the method comprising the fusion of the GPS and INS sensor data.

Figure 5:
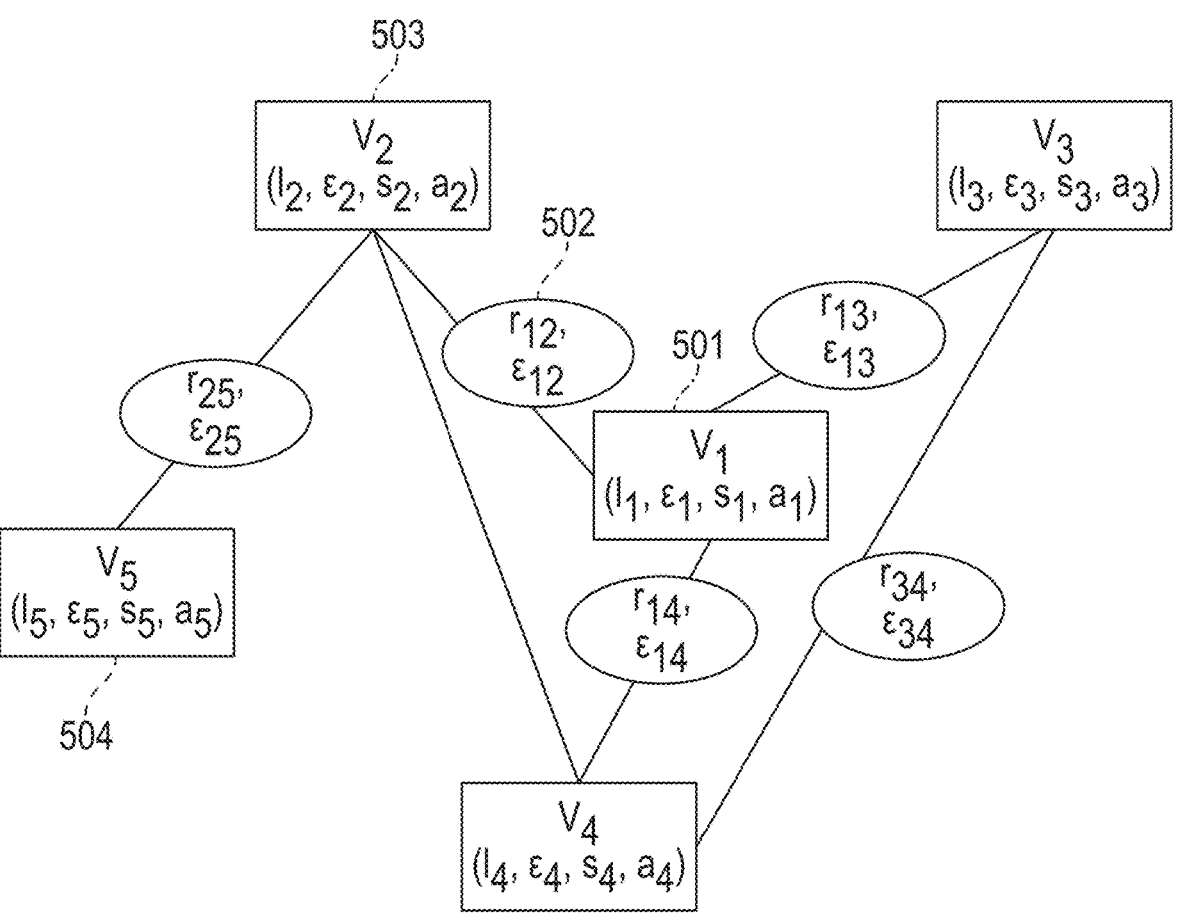
FIG. 5 depicts a schematic of kinematics data associated with vehicles in a plurality of vehicles, in accordance with some embodiments.

Example 2—A Distributed System for Improving Location Measurements in a Fleet of Vehicles FIG. 5 depicts a schematic illustrating a distributed system of vehicles. In FIG. 5, solid lines denote connections between two vehicles, such that the two vehicles can transmit data or information, between each other. The lack of a solid line between the rectangle symbolizing $v_5$ and its associated data, and the rectangle symbolizing $v_4$ and its associated data, denote that vehicle $v_5$ and vehicle $v_4$ cannot exchange data, because they may be, for example, out of range for data communication. In general for FIG. 5, rectangles, such as rectangles 501, 503, and 504 denote vehicles and their associated kinematics data, such as vehicle $v_1$ and its associated data comprising $l_1$, $\varepsilon_1$, $s_1$, and $a_1$, vehicle $v_2$ and its associated data comprising $l_2$, $\varepsilon_2$, $s_2$, and $a_2$, and vehicle $v_5$ and its associated data comprising $l_5$, $\varepsilon_5$, $s_5$, and $a_5$. Ellipses, such as ellipse 502, denote data applicable to pairs of vehicles, such as $r_{12}$ and $\varepsilon_{12}$, which represents the ranging distance between vehicle 1 and vehicle 2, and the accuracy associated with the ranging distance between vehicle 1 and vehicle 2. The example plurality or fleet of vehicles as depicted in FIG. 5 represent a network of vehicles and the types of data relevant to vehicles that are members of the fleet, including pairs of vehicles in the fleet. The data types depicted in FIG. 5 can be used in the methods or systems described herein, to improve the accuracy of kinematics data estimates.

All publications, patents, and patent applications are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

EXEMPLARY EMBODIMENTS

Exemplary embodiments of the methods and systems described herein include:

1) A method comprising:
   receiving, at one or more processors, from a sensor on a first vehicle, a first kinematic dataset describing the first vehicle, wherein the first kinematic dataset comprises a) a first location data of the first vehicle and b) a first ranging distance data for a first pair of vehicles comprising the first vehicle;
   receiving, at the one or more processors, a second kinematic dataset describing a plurality of vehicles, wherein the second kinematic dataset comprises a location data of a vehicle other than the first vehicle in the plurality of vehicles, and;
   fusing, at the one or more processors, data from the first kinematic dataset and data from the second kinematic dataset, to generate a fused dataset,
   wherein the fused dataset comprises a fused location data of the first vehicle and a fused ranging distance data for the first pair,
   wherein the fused location data of the first vehicle has a higher accuracy than the first location data of the first vehicle and the fused ranging distance data for the first pair has a higher accuracy than the first ranging distance data of the first pair.
2) The method of embodiment 1, wherein the second kinematic dataset further comprises a second ranging distance data for a second pair of vehicles, not including the first vehicle, in the plurality of vehicles.
3) The method of embodiment 1 or embodiment 2, wherein the method further comprises moving the first vehicle or the vehicle other than the first vehicle in the plurality of vehicles, based on the fused dataset.
4) The method of any of embodiments 1-3, wherein the first kinematic dataset comprises a time at which the first kinematic dataset is received.
5) The method of any of embodiments 1-4, wherein, the method is performed at a regular interval.

6) The method of any of embodiments 1-5 wherein the regular interval is 500 ms.

7) The method of any of embodiments 1-6, wherein the second kinematic dataset comprises data received from a sensor on the vehicle other than the first vehicle in the plurality of vehicles.

8) The method of any of embodiments 1-7, wherein the second kinematic dataset comprises data determined by the vehicle other than the first vehicle in the plurality of vehicles.

9) The method of any of embodiments 1-8, wherein the fused dataset is a first fused dataset, and the second kinematic dataset comprises data from a second fused dataset.

10) The method of embodiment 9, wherein the second fused dataset is determined by the vehicle other than the first vehicle in the plurality of vehicles.

11) The method of any of embodiments 1-10, wherein the second kinematic dataset comprises a time at which the second kinematic dataset is received.

12) The method of any of embodiments 1-11, wherein the first kinematic dataset further comprises a first acceleration, a first velocity, or a first displacement, of the first vehicle.

13) The method of any of embodiments 1-12, wherein the second kinematic dataset further comprises a second acceleration, a second velocity, or a second displacement, of the vehicle other than the first vehicle in the plurality of vehicles.

14) The method of embodiment 12 or 13, wherein the first acceleration or second acceleration is determined by an inertial measurement unit (IMU).

15) The method of embodiment 12 or 13, wherein the first velocity or the second velocity is determined by GPS, ultra-wideband (UWB), Bluetooth, 4G, 5G, or a combination thereof.

16) The method of embodiment 12 or 13, wherein the first displacement or the second displacement is determined by GPS, UWB, Bluetooth, 4G, 5G, or a combination thereof.

17) The method of any of embodiments 1-16, wherein the first, second, or fused ranging distance is determined by LIDAR, UWB, 5G, or a combination thereof.

18) The method of any of embodiments 1-17, wherein the first or second location data is determined by GPS, UWB, Bluetooth, 4G, 5G, or a combination thereof.

19) The method of embodiment 18, wherein the first or second location data is determined by combining a plurality of location data determined by multiple sensor modalities.

20) The method of embodiment 19, wherein the combining of the multiple sensor modalities determining the first or second location data is based on a number of sensor modalities, an accuracy associated with a sensor modality, and an element of a Cartesian coordinate location data determined by the sensor modality.

21) The method of embodiment 20, wherein the combining of the multiple sensor modalities determining the first or second location data is described by:

$$\frac{\sum_{i=1}^{n} \frac{1}{\varepsilon_i^2} c_i}{\sum_{j=1}^{n} \frac{1}{\varepsilon_j^2}}$$

wherein i is a first index, j is a second index, n is the number of sensor modalities, $\varepsilon$ is an accuracy associated with the sensor modality, and c is the element of the Cartesian coordinate location data determined by the sensor modality.

22) The method of embodiment 21, wherein c is an x-coordinate, a y-coordinate, or a z-coordinate of the Cartesian coordinate location data.

23) The method of embodiment 22, wherein an accuracy associated with the combining of the multiple sensor modalities determining the first or second location data is based on an accuracy associated with a first sensor modality determining the first or second location data and an accuracy associated with a second sensor modality determining the first or second location data.

24) The method of embodiment 23, wherein the accuracy associated with the combining of the multiple sensor modalities determining the first or second location data is described by:

$$\varepsilon^2 = \frac{1}{\frac{1}{\varepsilon_i^2} + \frac{1}{\varepsilon_j^2}}$$

wherein $\varepsilon$ is the accuracy associated with the combining of the multiple sensor modalities determining the first or second location data, $\varepsilon_i$ is the accuracy associated with the first sensor modality determining the first or second location data, and $\varepsilon_j$ is the accuracy associated with the second sensor modality determining the first or second location data.

25) The method of any of embodiments 1-24, wherein fusing the data from the first kinematic dataset and the data from the second kinematic dataset to generate the fused dataset comprises:

determining a distance between the first location data of the first vehicle and a second location data of a second vehicle, wherein the second vehicle is a member of the first pair;

determining a difference between a) the distance and b) the first ranging distance data between the first vehicle and the second vehicle;

changing the first location data by a first amount, wherein the first amount is based on the difference, an accuracy associated with the first location data, an accuracy associated with the second location data, and an accuracy associated with the ranging distance data;

changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle is based on the first location data changed by the first amount, and the fused ranging distance data is based on the ranging distance data changed by the third amount.

26) The method of embodiment 25, wherein the method further comprises determining a fused second location data of the second vehicle, and a fused distance between the first location data and the second location data.

27) The method of embodiment 26, wherein the method is iterative with respect to the steps of changing the first location data, changing the second location data, and changing the ranging distance data.

28) The method of embodiment 27, wherein the iterative method stops after a predetermined number of iterations.

29) The method of embodiment 27 or 28, wherein the iterative method stops after the fused first location data, the fused second location data, the fused ranging distance data, or the fused distance data reach a threshold floating point accuracy.

30) The method of any of embodiments 25-29, wherein an accuracy associated with the fused first location data is based on the accuracy associated with the first location data, a number of vehicles adjacent to the first vehicle, and the accuracy associated with the ranging distance data.

31) The method of embodiment 30, wherein the accuracy associated with the fused first location data is described by:

$$\varepsilon_i' = \frac{\varepsilon_i}{\sqrt{n}} + 0.3\frac{1}{n}\sum_{1}^{n}\varepsilon_{ij}$$

wherein $\varepsilon_i'$ is the accuracy associated with the fused first location data, $\varepsilon_i$ is the accuracy of the first location data, n is the number of vehicles adjacent to the first vehicle, and $\varepsilon_{ij}$ is the accuracy associated with the ranging distance data.

32) The method of any of embodiments 25-31, wherein an accuracy associated with the fused ranging distance data is based on the accuracy associated with the fused first location data, an accuracy associated with the fused second location data, and the accuracy associated with the ranging distance data.

33) The method of embodiment 32, wherein the accuracy associated with the fused ranging distance data is described by:

$$\varepsilon_{ij}'^2 = \frac{1}{\frac{1}{\varepsilon_i'^2} + \frac{1}{\varepsilon_j'^2} + \frac{1}{\varepsilon_{ij}^2}}$$

wherein $\varepsilon_{ij}'$ is the accuracy of the associated with the fused ranging distance data, $\varepsilon_i'$ is the accuracy associated with the fused first location data, $\varepsilon_j'$ is the accuracy associated with the fused second location data, and $\varepsilon_{ij}$ is the accuracy associated with the ranging distance data.

34) The method of any of embodiments 25-33, wherein the first location data, the second location data, the distance, the ranging distance data, the accuracy associated with the first location data, the accuracy associated with the second location data, the fused first location data, the fused second location data, the fused ranging distance data, the fused distance, the accuracy associated with the fused first location data, the accuracy associated with the fused second location data, or the accuracy associated with the fused ranging distance data is transmitted between vehicles in the plurality of vehicles.

35) The method of any of embodiments 1-34, wherein the vehicle other than the first vehicle in the plurality of vehicles transmits the second kinematic dataset to the first vehicle.

36) The method of embodiment 35, wherein the transmitted second kinematic dataset comprises data describing the first vehicle.

37) The method of embodiment 35 or 36, wherein the transmitted second kinematic dataset comprises data describing a vehicle adjacent to the vehicle other than the first vehicle in the plurality of vehicles.

38) The method of any of embodiments 35-37, wherein the transmitted second kinematic dataset is sent via a radio communication channel.

39) The method of embodiment 38, wherein the radio communication channel is ultra-wideband.

40) The method of any of embodiments 1-39, wherein the method is performed on at least one vehicle in the plurality of vehicles.

41) The method of any of embodiments 1-40, wherein the method is performed concurrently across multiple vehicles.

42) The method of any of embodiments 1-41, wherein the fused dataset overwrites the first kinematic dataset or the second kinematic dataset.

43) The method of any of embodiments 1-42, wherein the fused dataset is stored alongside the first kinematic dataset or the second kinematic dataset.

44) A system comprising:
   one or more processors; and
   a memory communicatively coupled to the one or more processors and configured to store instructions that, when executed by the one or more processors, cause the system to:
      receive from a sensor on a first vehicle, a first kinematic dataset describing the first vehicle, wherein the first kinematic dataset comprises a first location data of the first vehicle and a first ranging distance data for a first pair of vehicles comprising the first vehicle;
      receive a second kinematic dataset describing a plurality of vehicles, wherein the second kinematic dataset comprises a location data of a vehicle other than the first vehicle in the plurality of vehicles, and;
      fuse data from the first kinematic data and data from the second kinematic dataset, to generate a fused dataset,
         wherein the fused dataset comprises a fused location data of the first vehicle and a fused ranging distance data for the first pair,
            wherein the fused location data of the first vehicle has a higher accuracy than the first location data of the first vehicle and the fused ranging distance data for the first pair has a higher accuracy than the first ranging distance data of the first pair.

45) The system of embodiment 44, wherein the second kinematic dataset further comprises a second ranging distance data for a second pair of vehicles, not including the first vehicle, in the plurality of vehicles.

46) The system of embodiment 44 or embodiment 45, wherein the method further comprises moving the first vehicle or the vehicle other than the first vehicle in the plurality of vehicles, based on the fused dataset.

47) A non-transitory computer-readable storage medium storing one or more programs, the one or more programs comprising instructions that, when executed by one or more processors of a system, cause the system to:

receive from a sensor on a first vehicle, a first kinematic dataset describing the first vehicle, wherein the first kinematic dataset comprises a first location data of the first vehicle and a first ranging distance data for a first pair of vehicles comprising the first vehicle;

receive a second kinematic dataset describing a plurality of vehicles, wherein the second kinematic dataset comprises a location data of a vehicle other than the first vehicle in the plurality of vehicles, and;

fuse data from the first kinematic data and data from the second kinematic dataset, to generate a fused dataset, wherein the fused dataset comprises a fused location data of the first vehicle and a fused ranging distance data for the first pair, wherein the fused location data of the first vehicle has a higher accuracy than the first location data of the first vehicle and the fused ranging distance data for the first pair has a higher accuracy than the first ranging distance data of the first pair.

48) The non-transitory computer-readable storage medium of embodiment 47, wherein the second kinematic dataset further comprises a second ranging distance data for a second pair of vehicles, not including the first vehicle, in the plurality of vehicles.

49) The non-transitory computer-readable storage medium of embodiment 48, wherein the method further comprises moving the first vehicle or the vehicle other than the first vehicle in the plurality of vehicles, based on the fused dataset.

What is claimed is:

1. A method comprising:

receiving, at one or more processors, from a sensor on a first vehicle in a plurality of vehicles, a first kinematic dataset describing the first vehicle, wherein the first kinematic dataset comprises a) a first location data of the first vehicle and b) a first ranging distance data for a first pair of vehicles in the plurality of vehicles, the first pair consisting of the first vehicle and a second vehicle, wherein the first ranging distance data is measured between the first vehicle and the second vehicle;

receiving, at the one or more processors, from a source other than the sensor on the first vehicle, a second kinematic dataset comprising location data of at least one vehicle in the plurality of vehicles;

fusing, at the one or more processors, data from the first kinematic dataset and data from the second kinematic dataset, to generate a fused dataset, wherein fusing the data from the first kinematic dataset and the data from the second kinematic dataset to generate the fused dataset comprises:

determining a distance between the first location data of the first vehicle and a second location data of the second vehicle;

determining a difference between a) the distance and b) the first ranging distance data between the first vehicle and the second vehicle;

changing the first location data by a first amount, wherein the first amount is based on the difference, an accuracy associated with the first location data, an accuracy associated with the second location data, and an accuracy associated with the ranging distance data;

changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle is based on the first location data changed by the first amount, and the fused ranging distance data is based on the ranging distance data changed by the third amount, and wherein the fused dataset comprises a fused location data of the first vehicle and a fused ranging distance data for the first pair; and moving the at least one vehicle based on the fused dataset.

2. The method of claim 1, wherein the second kinematic dataset further comprises a second ranging distance data for a second pair of vehicles, not including the first vehicle, in the plurality of vehicles.

3. The method of any of claim 1, wherein the first kinematic dataset comprises a time at which the first kinematic dataset is received.

4. The method of claim 1, wherein the source other than the sensor on the first vehicle is a sensor on a vehicle other than the first vehicle in the plurality of vehicles.

5. The method of claim 1, wherein the second kinematic dataset comprises data determined by a vehicle other than the first vehicle in the plurality of vehicles.

6. The method of claim 1, wherein the fused dataset is a first fused dataset, and the second kinematic dataset comprises data from a second fused dataset.

7. The method of claim 1, wherein the first kinematic dataset further comprises a first acceleration, a first velocity, or a first displacement, of the first vehicle.

8. The method of claim 1, wherein the second kinematic dataset further comprises a second acceleration, a second velocity, or a second displacement, of a vehicle other than the first vehicle in the plurality of vehicles.

9. The method of claim 1, wherein the first, second, or fused ranging distance is determined by LIDAR, UWB, 5G, or a combination thereof.

10. The method of claim 1, wherein the first or second location data is determined by GPS, UWB, Bluetooth, 4G, 5G, or a combination thereof.

11. The method of claim 1, wherein the first or second location data is determined by combining a plurality of location data determined by multiple sensor modalities.

12. The method of claim 1, wherein the method further comprises determining a fused second location data of the second vehicle, and a fused distance between the first location data and the second location data.

13. The method of claim 12, wherein the method is iterative with respect to the steps of changing the first location data, changing the second location data, and changing the ranging distance data.

14. The method of claim 13, wherein the iterative method stops after the fused first location data, the fused second location data, the fused ranging distance data, or the fused distance data reach a threshold floating point accuracy.

15. The method of claim 1, wherein the first location data, the second location data, the distance, the ranging distance data, the accuracy associated with the first location data, the accuracy associated with the second location data, the fused first location data, the fused second location data, the fused ranging distance data, the fused distance, the accuracy associated with the fused first location data, the accuracy associated with the fused second location data, or the accuracy associated with the fused ranging distance data is transmitted between vehicles in the plurality of vehicles.

16. The method of claim 1, wherein the source other than the sensor on the first vehicle is a vehicle other than the first vehicle.

17. The method of claim 16, wherein the transmitted second kinematic dataset is sent via a radio communication channel.

18. The method of claim 17, wherein the radio communication channel is ultra-wideband.

19. The method of claim 1, wherein the at least one vehicle is the first vehicle.

20. The method of claim 1, wherein the at least one vehicle is any vehicle in the plurality of vehicles other than the first vehicle.

21. The method of claim 1, wherein the at least one vehicle is a second pair of vehicles.

22. A system comprising:

one or more processors; and a memory communicatively coupled to the one or more processors and configured to store instructions that, when executed by the one or more processors, cause the system to:

receive, from a sensor on a first vehicle in a plurality of vehicles, a first kinematic dataset describing the first vehicle, wherein the first kinematic dataset comprises a first location data of the first vehicle and a first ranging distance data for a first pair of vehicles in the plurality of vehicles, the first pair consisting of the first vehicle and a second vehicle, wherein the first ranging distance data is measured between the first vehicle and the second vehicle;

receive, from a source other than the sensor on the first vehicle, a second kinematic dataset comprising location data of at least one vehicle in the plurality of vehicles;

fuse data from the first kinematic dataset and data from the second kinematic dataset, to generate a fused dataset, wherein fusing the data from the first kinematic dataset and the data from the second kinematic dataset to generate the fused dataset comprises:

determining a distance between the first location data of the first vehicle and a second location data of the second vehicle;

determining a difference between a) the distance and b) the first ranging distance data between the first vehicle and the second vehicle;

changing the first location data by a first amount, wherein the first amount is based on the difference, an accuracy associated with the first location data, an accuracy associated with the second location data, and an accuracy associated with the ranging distance data;

changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle is based on the first location data changed by the first amount, and the fused ranging distance data is based on the ranging distance data changed by the third amount, and wherein the fused dataset comprises a fused location data of the first vehicle and a fused ranging distance data for the first pair; and move the at least one vehicle based on the fused dataset.

23. The system of claim 22, wherein the second kinematic dataset further comprises a second ranging distance data for a second pair of vehicles, not including the first vehicle, in the plurality of vehicles.

24. A non-transitory computer-readable storage medium storing one or more programs, the one or more programs comprising instructions that, when executed by one or more processors of a system, cause the system to:

receive, from a sensor on a first vehicle in a plurality of vehicles, a first kinematic dataset describing the first vehicle, wherein the first kinematic dataset comprises a first location data of the first vehicle and a first ranging distance data for a first pair of vehicles in the plurality of vehicles, the first pair consisting of the first vehicle and a second vehicle, wherein the first ranging distance data is measured between the first vehicle and the second vehicle;

receive, from a source other than the sensor on the first vehicle, a second kinematic dataset comprising location data of at least one vehicle in the plurality of vehicles;

fuse data from the first kinematic dataset and data from the second kinematic dataset, to generate a fused dataset, wherein fusing the data from the first kinematic dataset and the data from the second kinematic dataset to generate the fused dataset comprises:

determining a distance between the first location data of the first vehicle and a second location data of the second vehicle;

determining a difference between a) the distance and b) the first ranging distance data between the first vehicle and the second vehicle;

changing the first location data by a first amount, wherein the first amount is based on the difference, an accuracy associated with the first location data, an accuracy associated with the second location data, and an accuracy associated with the ranging distance data;

changing the second location data by a second amount, wherein the second amount is based on the difference, an accuracy associated with the first location data, an accuracy associated with the second location data, and an accuracy associated with the ranging distance data; and changing the ranging distance data by a third amount, wherein the third amount is based on the difference, the accuracy associated with the ranging distance data, the accuracy associated with the first location data, and the accuracy associated with the second location data, wherein the fused location data of the first vehicle is based on the first location data changed by the first amount, and the fused ranging distance data is based on the ranging distance data changed by the third amount, and wherein the fused dataset comprises a fused location data of the first vehicle and a fused ranging distance data for the first pair; and move the at least one vehicle based on the fused dataset.

25. The non-transitory computer-readable storage medium of claim 24, wherein the second kinematic dataset further comprises a second ranging distance data for a second pair of vehicles, not including the first vehicle, in the plurality of vehicles.

* * * * *